United States Patent Office 3,184,456
Patented May 18, 1965

3,184,456
REDUCED MALEIMIDE ADDUCTS OF
α-PHELLANDRENE
Raymond O. Clinton, East Greenbush, and Andrew John Manson, North Greenbush, N.Y., assignors to Sterling Drug Inc., New York, N.Y., a corporation of Delaware
No Drawing. Original application Sept. 12, 1960, Ser. No. 55,125. Divided and this application May 16, 1963, Ser. No. 281,020
8 Claims. (Cl. 260—247.5)

This invention relates to novel terpene derivatives, and in particular is concerned with the maleimide adduct of α-phellandrene further substituted on the nitrogen atom by a tertiary-amino-lower-alkyl group, with certain transformation products thereof, and with processes for the preparation of the new compounds.

A preferred class of compounds of the invention comprises those having in the free base form the formula

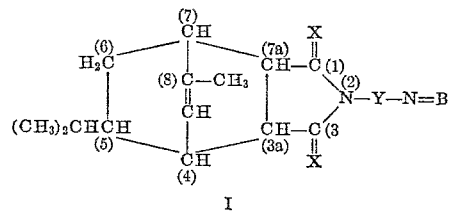

I wherein X represents two hydrogen atoms ($H_2$) or an oxygen atom (O), Y represents lower-alkylene, and N=B represents tertiary-amino.

The compounds of the above Formula I can be named systematically as derivatives of isoindoline, viz.: 1,3-$H_2$-4,7 - etheno - 5 - isopropyl - 8 - methyl-2-(tertiary-amino-lower-alkyl)-3a,4,5,6,7,7a-hexahydroisoindoline.

In the above general Formula I, N=B represents a tertiary-amino radical. By a tertiary-amino radical is meant a radical of the type ZZ'N— wherein Z and Z' are both organic substituents so that the complete molecule to which it is attached is a tertiary-amine. The tertiary-amino radical is preferably basic and has a molecular weight less than about 200. Basic tertiary-amino radicals are those of the aliphatic or araliphatic type that impart to the molecules which contain them sufficient basicity (ionization to the extent of at least $10^{-6}$) so that the compounds readily form acid-addition salts with strong inorganic and organic acids. A particularly preferred group of tertiary-amino radicals are di-lower-alkylamino, for example, dimethylamino, diethylamino, dibutylamino, methylethylamino, and the like; dicycloalkylamino in which the cycloalkyl has from 5 to 6 ring members, for example, dicyclopentylamino, dicyclohexylamino, bis(4-methylcyclohexyl)amino, and the like; N-(cycloalkyl)-lower-alkylamino in which the cycloalkyl has from 5 to 6 ring members, for example, N-(cyclohexyl)methylamino, N-(cyclopentyl)ethylamino, and the like; polymethylenimino having from 5 to 7 ring members, for example, 1-pyrrolidyl, 1-piperidyl, hexamethylenimino and lower-alkylated derivatives thereof; 4-morpholinyl; 1-piperazinyl; 4-hydrocarbon-substituted-1-piperazinyl in which the hydrocarbon substituent has from 1 to 10 carbon atoms, for example, 4-methyl-1-piperazinyl, 4-phenyl-1-piperazinyl, and the like; di-(phenyl-lower-alkyl)amino, for example, dibenzylamino, bis(phenylethyl)amino, and the like; and N-(phenyl-lower-alkyl)-N-lower-alkylamino, for example, N-(benzyl)methylamino, N-(phenylethyl)ethylamino, and the like. In the foregoing radicals, the term lower-alkyl stands for alkyl groups containing from one to six carbon atoms.

In the above general Formula I, Y stands for a lower-alkylene bridge, having from two to five carbon atoms,
in which the points of attachment to the remainder of the molecule are on different carbon atoms. In other words, the two nitrogen atoms of the molecule are separated by at least two carbon atoms. The lower-alkylene bridge can be straight or branched and includes such groupings as

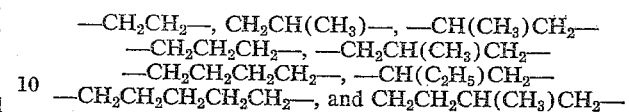

—$CH_2CH_2CH_2CH_2$—, and —$CH_2CH_2CH(CH_3)CH_2$—

The compounds of Formula I wherein X represents O are prepared by causing the maleic anhydride adduct of α-phellandrene to react with a tertiary-amino-lower-alkylamine of the formula $H_2N$—Y—N=B, wherein Y and N=B have the meanings given hereinabove. The process is carried out by heating approximately equimolar quantities of the reactants at a temperature between about 50° C. and 150° C. in an inert organic solvent, preferably with means for removing the water formed in the reaction.

The compounds of Formula I wherein X represents $H_2$ are prepared by causing a compound of Formula I wherein X represents O to react with lithium aluminum hydride. The process is carried out by mixing the imide with an excess of lithium aluminum hydride suspended in an inert organic solvent at a temperature between about 20° C. and 100° C.

An alternative method for preparing compounds of Formula I wherein X represents O comprises reacting a metal salt of the maleimide adduct of α-phellandrene with a tertiary-amino-lower-alkyl halide, hal—Y—N=B. The maleimide adduct of α-phellandrene (1,3-dioxo-4,7-etheno-5-isopropyl-8 - methyl - 3a,4,5,6,7,7a - hexahydro-isoindoline) is a novel compound and is prepared by heating together the maleic anhydride adduct of α-phellandrene with formamide.

An alternative method for preparing compounds of the Formula I where X represents $H_2$ comprises reducing the maleimide adduct of α-phellandrene with lithium aluminum hydride to give the corresponding pyrrolidine derivative, followed by reacting the latter with a tertiary-amino-lower-alkyl halide, hal—Y—N=B, in the presence of an acid acceptor.

The compounds of formula I are basic in character, those where X is O (derivatives of succinimide) having one basic center and those where X is $H_2$ (derivatives of pyrrolidine) having two basic centers. The compounds where X is O thus form mono-acid-addition salts upon addition of strong acids and mono-quaternary ammonium salts upon addition of esters of strong acids. The compounds where X is $H_2$ form mono- or di(acid-addition salts and mono- or di-quaternary ammonium salts. The salts are the full equivalent of the corresponding free bases insofar as their physiological properties are concerned. Both the free base and salt forms are considered to be one and the same invention.

The acid-addition salts are prepared by causing the free base to react with a strong inorganic or organic acid, usually in an inert solvent or reaction medium. Examples of appropriate acids include hydrochloric, hydrobromic, sulfuric, phosphoric, citric, tartaric, quinic benzenesulfonic acid, and the like.

The quaternary ammonium salts of the compounds of the invention are prepared by causing a free base to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride o-chlorobenzyl chloride, and the like. The reaction of the free base and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate benzenesulfonate, and the like. Salts having toxic anions are, however, useful in that they serve as characterizing derivatives of the free base and serve as intermediates for non-toxic quaternary salts by conventional ion exchange reactions. All acid-addition salts regardless of the nature of the anions, are useful as intermediates in the purification of the free bases.

Pharmacological evaluation of the compounds of the invention has shown that they possess hypotensive and coronary dilator activity when administered to animal organisms in non-toxic doses. The new compounds are thus useful in lowering blood pressure and alleviating the work load on the heart. They are administered either subcutaneously in the form of a sterile, isotonic aqueous solution or suspension, or orally in the form of tablets, powder or aqueous dispersions. The compounds are formulated in conventional fashion using an appropriate amount of the active ingredient or a salt thereof with ordinary pharmaceutical excipients.

The structure of the compounds of the invention was established by the mode of synthesis, by infrared spectral data, and by the fact that elementary analyses were in agreement with the assigned structures.

The following examples will further illustrate the invention without the latter being limited thereby.

*Example 1*

2-[2-(4-morpholinyl)ethyl] - 1,3 - dioxo - 4,7-etheno-5-isopropyl-8-methyl-3a,4,5,6,7,7a-hexahydroisoindoline [I; X is O, Y is CH$_2$CH$_2$, N=B is N(CH$_2$CH$_2$)$_2$O].—A mixture of 23.4 g. (0.10 mole) of the maleic anhydride adduct of α-phellandrene, 14.3 g. (0.110 mole) of 2-(4-morpholinyl)ethylamine and 150 ml. of benzene was refluxed under a water trap for six hours. The reaction mixture was then cooled and the benzene removed in vacuo. To the residue was then added 100 ml. of toluene and the mixture again concentrated to dryness. The residue was crystallized from an n-hexane-methanol mixture to give 37.3 g. of product, M.P. 84–94° C. (uncorr.). The latter was recrystallized from n-hexane and from methanol and dried at 65° C. in vacuo for eight hours to give 2-[2-(4-morpholinyl)ethyl]-1,3-dioxo-4,7-etheno-5-isopropyl-8-methyl-3a,4,5,6,7,7a-hexahydroisoindoline, colorless crystals M.P. 95.8–98.0° C. (corr.), $[\alpha]_D^{25}$ = −7.6° ±0.2° (1% in chloroform).

*Analysis.*—Calcd. for C$_{20}$H$_{30}$N$_2$O$_3$: C 69.33; H, 8.73; N, 8.09; O, 13.85. Found: C, 69.45; H, 8.88; N, 8.02; O, 13.84.

2-[2-(4-morpholinyl)ethyl]-1,3-dioxo - 4,7 - etheno-5-isopropyl-8-methyl-3a,4,5,6,7,7a - hexahydroisoindoline is obtained in the form of its hydrofluoride, hydrobromide, hydriodide, sulfate (or bisulfate), phosphate (or acid phosphate), acetate, tartrate (or bitartrate), lactate, citrate (or acid citrate), benzenesulfonate, ethanesulfonate, methiodide, allobromide or benzochloride salt, when contacted, respectively, with hydrofluoric acid, hydrobromic acid, hydriodic acid, sulfuric acid, phosphoric acid, acetic acid, tartaric acid, lactic acid, citric acid, benzenesulfonic acid, ethanesulfonic acid, methyl iodide, allyl bromide or benzyl chloride.

2-[2-(4-morpholinyl)ethyl]-1,3-dioxo - 4,7 - etheno-5-isopropyl-8-methyl-3a,4,5,6,7,7a - hexahydroisoindoline in the form of its hydrofluoride salt can be converted to the hydrochloride salt by passing an aqueous solution of the former over an ion-exchange resin saturated with chloride ion.

2-[2-(4-morpholinyl)ethyl]-1,3-dioxo - 4,7 - etheno-5-isopropyl-8-methyl-3a,4,5,6,7,7a - hexahydroisoindoline in acid-addition salt form was found to have a minimum effective hypotensive dose of about 0.10 mg./kg. of body weight when injected subcutaneously into renal hypertensive rats and measured by the photoelectric foot method of Kersten et al., J. Lab. Clin. Med. 32, 1090 (1947). The intravenous toxcity (ALD$_{50}$) in the mouse was found to be 60 mg./kg.

*Example 2*

2-(3-hexamethyleniminopropyl)-1,3-dioxo-4,7-etheno-5-isopropyl-8-methyl-3a,4,5,6,7,7a-hexahydroisoindoline [I; X is O, Y is CH$_2$CH$_2$CH$_2$, N=B is N(CH$_2$)$_6$] was prepared from 23.43 g. of the maleic anhydride adduct of α-phellandrene, 17.19 g. of 3-hexamethyleniminopropylamine and 300 ml. of benzene according to the manipulative procedure described above in Example 1. The product thus obtained was treated with excess ethereal hydrogen chloride, and the salt thus formed was recrystallized from a methanol-ether mixture and dried at 80° C. in vacuo over phosphorus pentoxide for four hours to give 27.89 g. of 2-(3-hexamethyleniminopropyl)-1,3-dioxo-4,7-etheno-5-isopropyl-8-methyl-3a,4,5,6,7,7a-hexahydroisoindoline in the form of its hydrochloride salt, colorless solid, M.P. 182.2–183.4° C. (corr.), $[\alpha]_D^{25}$=−9.89° (1% in ethanol).

*Analysis.*—Calcd. for C$_{23}$H$_{36}$N$_2$O$_2$.HCl: C, 67.54; H, 9.12; Cl, 8.67. Found: C, 67.25; H, 8.91; Cl, 8.65.

2-(3-hexamethyleniminopropyl)-1,3-dioxo-4,7-etheno-5-isopropyl-8-methyl-3a,4,5,6,7,7a - hexahydroisoindoline in the form of its hydrochloride salt was found to have a minimum effective hypotensive dose of about 0.10 mg./kg. of body weight when injected subcutaneously into renal hypertensive rats and measured by the photoelectric foot method of Kersten et al., loc. cit. The intravenous toxicity (ALD$_{50}$) in the mouse was found to be 28 mg./kg.

*Example 3*

2-(2-diethylaminoethyl)1,3-dioxo-4,7-etheno-5 - isopropyl-8-methyl-3a,4,5,6,7,7a-hexahydroisoindoline [I; X is O, Y is CH$_2$CH$_2$, N=B is N(C$_2$H$_5$)$_2$] was prepared from 23.43 g. of the maleic anhydride adduct of α-phellandrene, 12.78 g. of 2-diethylaminoethylamine and 300 ml. of benzene according to the manipulative procedure described above in Example 1. The product was converted to its hydrochloride salt which was recrystallized twice from an ethyl acetate-ether mixture and dried at 50–55° C. in vacuo for twenty-four hours to give 28.06 g. of 2-(2-diethylaminoethyl)-1,3-dioxo-4,7-etheno-5 - isopropyl-8-methyl-3a,4,5,6,7,7a - hexahydroisoindoline in the form of its hydrochloride salt, colorless solid, M.P. 109.6–112.2° C. (corr.), $[\alpha]_D^{25}$=−9.7° (1% in absolute ethanol).

*Analysis.*—Calcd. for C$_{20}$H$_{32}$N$_2$O$_2$.HCl: N, 7.59; Cl, 9.61. Found: N, 7.34; Cl, 9.68.

*Example 4*

2-[3-(1-pyrrolidyl)propyl]-1,3-dioxo-4,7-etheno-5 - isopropyl-8-methyl - 3a,4,5,6,7,7a - hexahydroisoindoline (I; X is O, Y is CH$_2$CH$_2$CH$_2$, N=B is N(CH$_2$)$_4$] was prepared from 23.43 g. of the maleic anhydride adduct of α-phellandrene, 14.10 g. of 3 - (1-pyrrolidyl)propylamine and 300 ml. of benzene according to the manipulative procedure described above in Example 1. The product was converted to its hydrochloride salt, recrystallized from ethyl acetate and dried at 50° C. in vacuo for twenty-four hours to give 2-[3-(1pyrrolidyl)propyl]-1,3-dioxo-4,7-etheno-5-isopropyl-8-methyl-3a,4,5,6,7,7a-hexahydroisoindoline in the form of its hydrochloride salt, colorless solid, M.P. 178.8–180.2° C. (corr.), $[\alpha]_D^{25}$=−12.3° (1% in absolute ethanol).

*Analysis.*—Calcd. for $C_{21}H_{32}N_2O_2 \cdot HCl$: C, 66.21; H, 8.73; Cl, 9.31. Found: C, 66.17; H, 8.41; Cl, 9.49.

2-[3-(1-pyrrolidyl)propyl]-1,3-dioxo-4,7-etheno-5-isopropyl-8-methyl-3a,4,5,6,7,7a-hexahydroisoindoline in the form of its hydrochloride salt was found to have a coronary dilator activity about 52% that of papaverine when measured on the isolated rabbit heart by the method of Luduena et al., J. Am Pharm. Assoc., Sci. Ed. 44, 363–6 (1955). The intravenous toxicity ($ALD_{50}$) in the mouse was found to be 60 mg./kg.

Example 5

2-[2-(1-piperidyl)ethyl]-1,3-dioxo-4,7-etheno-5-isopropyl-8-methyl-3a,4,5,6,7,7a-hexahydroisoindoline [I; X is O, Y is $CH_2CH_2$, N=B is $N(CH_2)_5$] was prepared from 23.43 g. of the maleic anhydride adduct of α-phellandrene, 14.10 g. of 2-(1-piperidyl)-ethylamine and 300 ml. of benzene according to the manipulative procedure described above in Example 1. The product was converted to its hydrochloride salt, recrystallized from ethyl acetate and dried at 55° C. in vacuo for sixteen hours to give 30.27 g. of 2-[2-(1-piperidyl)ethyl]-1,3-dioxo-4,7-etheno-5-isopropyl-8-methyl-3a,4,5,6,7,7a-hexahydroisoindoline in the form of its hydrochloride salt, colorless solid, M.P. 192.6–194.2° C. (corr.), $[\alpha]_D^{25} = -8.8°$ (1% in absolute ethanol).

*Analysis.*—Calcd. for $C_{21}H_{32}N_2O_2 \cdot HCl$: C, 66.21; H, 8.73; Cl, 9.31. Found: C, 66.51; H, 8.56; Cl, 9.13.

Example 6

2-[2(1-piperazinyl)ethyl]-1,3-dioxo-4,7-etheno-5-isopropyl-8-methyl-3a,4,5,6,7,7a-hexahydroisoindoline [I; X is O, Y is $CH_2CH_2$, N=B is $N(CH_2CH_2)_2NH$] was prepared from 14.06 g. of the maleic anhydride adduct of α-phellandrene, 8.06 g. of 2-(1-piperazinyl)ethylamine and 300 ml. of benzene according to the manipulative procedure described above in Example 1. The product was converted to its hydrochloride salt, recrystallized from isopropyl alcohol and dried in vacuo at 55° C. over phosphorus pentoxide for sixteen hours and at 90° C. for twenty hours to give 22.59 g. of 2-[2-(1-piperazinyl)ethyl]-1,3-dioxo-4,7-etheno-5-isopropyl-8-methyl-3a,4,5,6,7,7a-hexahydroisoindoline in the form of its dihydrochloride salt, colorless solid, M.P. 268.6–271° C. (dec.) (corr.), $[\alpha]_D^{25} = -6.6°$ (1% in absolute ethanol).

*Analysis.*—Calcd. for $C_{20}H_{31}N_3O_2 \cdot 2HCl$: C, 57.41; H, 7.95; Cl, 16.95. Found: C, 57.21; H, 8.00; Cl, 16.70.

Example 7

2-(2-dimethylaminoethyl)-1,3-dioxo-4,7-etheno-5-isopropyl-8-methyl-3a,4,5,6,7,7a-hexahydroisoindoline [I; X is O, Y is $CH_2CH_2$, N=B is $N(CH_3)_2$] was prepared from 23.43 g. of the maleic anhydride adduct of α-phellandrene, 9.70 g. of 2-dimethylaminoethylamine and 300 ml. of benzene according to the manipulative procedure described above in Example 1. The crude product was dissolved in isopropyl alcohol and treated with a solution of phosphoric acid (12.10 g., 0.105 mole) in 25 ml. of isopropyl alcohol. The solution was boiled, allowed to cool, and ether added to bring about precipitation of the product. The latter was separated by filtration, recrystallized from an isopropyl alcohol-ethyl acetate mixture and dried at 70° C. in vacuo for eighteen hours and at 90–100° C. for twenty-four hours to give 28.92 g. of 2-(2-dimethylaminoethyl)-1,3-dioxo-4,7-etheno-5-isopropyl-8-methyl-3a,4,5,6,7,7a-hexahydroisoindoline in the form of its sesquiphosphate salt, colorless solid, M.P. 145.2–150° C. (corr.), $[\alpha]_D^{25} = -6.9°$ (1% in absolute ethanol).

*Analysis.*—Calcd. for $C_{18}H_{28}N_2O_2 \cdot 1\frac{1}{2}H_3PO_4$: N, 6.21; P, 10.29. Found: N, 6.30; P, 10.06.

Example 8

2-(2-N-methylethylaminoethyl)-1,3-dioxo-4,7-etheno-5-isopropyl-8-methyl-3a,4,5,6,7,7a-hexahydroisoindoline [I; X is O, Y is $CH_2CH_2$, N=B is $$N(CH_3)(C_2H_5)]$$

can be prepared by replacing the 2-(4-morpholinyl)-ethylamine in Example 1 by a molar equivalent amount of 2-N-methylethylaminoethylamine.

Example 9

2-(2-di-n-butylaminoethyl)-1,3-dioxo-4,7-etheno-5-isopropyl-8-methyl-3a,4,5,6,7,7a-hexahydroisoindoline [I; X is O, Y is $CH_2CH_2$, N=B is $N(C_4H_9)_2$] can be prepared by replacing the 2-(4-morpholinyl)ethylamine in Example 1 by a molar equivalent amount of 2-di-n-butylaminoethylamine.

Example 10

2-(2-di-n-hexylaminoethyl)-1,3-dioxo-4,7-etheno-5-isopropyl-8-methyl-3a,4,5,6,7,7a-hexahydroisoindoline [I; X is O, Y is $CH_2CH_2$, N=B is $N(C_6H_{13})_2$] can be prepared by replacing the 2-(4-morpholinyl)ethylamine in Example 1 by a molar equivalent amount of 2-di-n-hexylaminoethylamine.

Example 11

2-(2-dicyclohexylaminoethyl)-1,3-dioxo-4,7-etheno-5-isopropyl-8-methyl-3a,4,5,6,7,7a-hexahydroisoindoline [I; X is O, Y is $CH_2CH_2$, N=B is $N(C_6H_{11})_2$] can be prepared by replacing the 2-(4-morpholinyl)ethylamine in Example 1 by a molar equivalent amount of 2-dicyclohexylaminoethylamine.

Example 12

2-[2-bis(4-methylcyclohexyl)aminoethyl]-1,3-dioxo-4,7-etheno-5-isopropyl-8-methyl-3a,4,5,6,7,7a-hexahydroisoindoline [I; X is O, Y is $CH_2CH_2$, N=B is $$N(C_6H_{10}CH_3-4)_2]$$

can be prepared by replacing the 2-(4-morpholinyl)ethylamine in Example 1 by a molar equivalent amount of 2-bis(4-methylcyclohexyl)aminoethylamine.

Example 13

2-(2-N-methylcyclohexylaminoethyl)-1,3-dioxo-4,7-etheno-5-isopropyl-8-methyl-3a,4,5,6,7,7a-hexahydroisoindoline [I; X is O, Y is $CH_2CH_2$, N=B is $$N(CH_3)(C_6H_{11})]$$

can be prepared by replacing the 2-(4-morpholinyl)ethylamine in Example 1 by a molar equivalent amount of 2-N-methylcyclohexylaminoethylamine.

Example 14

2-[2-(2-methyl-1-pyrrolidyl)ethyl]-1,3-dioxo-4,7-etheno-5-isopropyl-8-methyl-3a,4,5,6,7,7a-hexahydroisoindoline [I; X is O, Y is $CH_2CH_2$, N=B is 2-methyl-1-pyrrolidyl] can be prepared by replacing the 2-(4-morpholinyl)ethylamine in Example 1 by a molar equivalent amount of 2-(2-methyl-1-pyrrolidyl)ethylamine.

Example 15

2-[2-(4-methyl-1-piperazinyl)ethyl]-1,3-dioxo-4,7-etheno-5-isopropyl-8-methyl-3a,4,5,6,7,7a-hexahydroisoindoline [I; X is O, Y is $CH_2CH_2$, N=B is $$N(CH_2)_4NCH_3]$$

can be prepared by replacing the 2-(4-morpholinyl)ethylamine in Example 1 by a molar equivalent amount of 2-(4-methyl-1-piperazinyl)ethylamine.

Example 16

2-(2-dibenzylaminoethyl)-1,3-dioxo-4,7-etheno-5-isopropyl-8-methyl-3a,4,5,6,7,7a-hexahydroisoindoline [I; X is O, Y is $CH_2CH_2$, N=B is $N(CH_2C_6H_5)_2$] can be prepared by replacing the 2-(4-morpholinyl)ethylamine in Example 1 by a molar equivalent amount of 2-dibenzylaminoethylamine.

Example 17

2 - [2-bis(2-phenylethyl)aminoethyl]-1,3-dioxo - 4,7-etheno-5-isopropyl-8-methyl - 3a,4,5,6,7,7a - hexahydroisoindoline [I; X is O, Y is $CH_2CH_2$, N=B is $$N(CH_2CH_2C_6H_5)_2]$$

can be prepared by replacing the 2-(4-morpholinyl)ethylamine in Example 1 by a molar equivalent amount of 2-bis(2-phenylethyl)aminoethylamine.

Example 18

2-(2-N-methylbenzylaminoethyl) - 1,3 - dioxo-4,7-etheno-5-isopropyl - 8 - methyl - 3a,4,5,6,7,7a - hexahydroisoindoline [I; X is O, Y is $CH_2CH_2$, N=B is $$N(CH_3)(CH_2C_6H_5)]$$

can be prepared by replacing the 2-(4-morpholinyl)ethylamine in Example 1 by a molar equivalent amount of 2-N-methylbenzylaminoethylamine.

Example 19

2-(2-dimethylamino-1-methylethyl) - 1,3 - dioxo-4,7-etheno-5-isopropyl-8-methyl - 3a,4,5,6,7,7a - hexahydroisoindoline [I; X is O, Y is $CH(CH_3)CH_2$, N=B is $$N(CH_3)_2]$$

can be prepared by replacing the 2-(4-morpholinyl)ethylamine in Example 1 by a molar equivalent amount 2-dimethylamino-1-methylethylamine.

Example 20

2-(2-dimethylaminopropyl) - 1,3 - dioxo-4,7-etheno-5-isopropyl-8-methyl - 3a,4,5,6,7,7a - hexahydroisoindoline [I; X is O, Y is $CH_2CH(CH_3)$, N=B is $N(CH_3)_2$] can be prepared by replacing the 2-(4-morpholinyl)ethylamine in Example 1 by a molar equivalent amount of 2-dimethylaminopropylamine.

Example 21

2-(4-dimethylaminobutyl) - 1,3 - dioxo-4,7-etheno - 5 - isopropyl-8-methyl - 3a,4,5,6,7,7a - hexahydroisoindoline [I; X is O, Y is $CH_2CH_2CH_2CH_2$, N=B is $N(CH_3)_2$] can be prepared by replacing the 2-(4-morpholinyl)ethylamine in Example 1 by a molar equivalent amount of 4-dimethylaminobutylamine.

Example 22

2-(5-dimethylaminopentyl) - 1,3 - dioxo-4,7-etheno - 5 - isopropyl-8-methyl - 3a,4,5,6,7,7a - hexahydroisoindoline [I; X is O, Y is $CH_2CH_2CH_2CH_2CH_2$, N=B is $N(CH_3)_2$] can be prepared by replacing the 2-(4-morpholinyl)ethylamine in Example 1 by a molar equivalent amount of 5-dimethylaminopentylamine.

Example 23

2-(2-dimethylamino-1,2-dimethylethyl) - 1,3 - dioxo-4,7-etheno - 5 - isopropyl - 8 - methyl-3a,4,5,6,7,7a-hexahydroisoindoline [I; X is O, Y is $CH(CH_3)CH(CH_3)$, N=B is $N(CH_3)_2$] can be prepared by replacing the 2-(4-morpholinyl)ethylamine in Example 1 by a molar equivalent amount of 2-dimethylamino - 1,2 - dimethylethylamine.

Example 24

2-[2-(4-morpholinyl)ethyl]-4,7-etheno - 5 - isopropyl-8-methyl - 3a,4,5,6,7,7a - hexahydroisoindoline [I; X is $H_2$, Y is $CH_2CH_2$, N=B is $N(CH_2CH_2)_2O$].—2-[2-(4-morpholinyl)ethyl] - 1,3 - dioxo-4,7-etheno-5-isopropyl-8-methyl - 3a,4,5,6,7,7a - hexahydroisoindoline (Example 1) (25.71 g., 0.0742 mole) was added rapidly to a suspension of 14.21 g. (0.375 mole) of lithium aluminum hydride in 1000 ml. of tetrahydrofuran in a nitrogen atmosphere. The reaction mixture was refluxed for four hours, and there was then added 28.5 ml. of water and 200 ml. of ether. The mixture was filtered, the filter cake washed well with hot chloroform, and the combined filtrates and washings were concentrated in vacuo. The residue was recrystallized from aqueous methanol and dried in vacuo over potassium hydroxide for forty-eight hours to give 12.0 g. of 2-[2-(4-morpholinyl)ethyl]-4,7-etheno-5-isopropyl - 8 - methyl-3a,4,5,6,7,7a-hexahydroisoindoline, colorless pellets, M.P. 34.2–37.2° C. (corr.), $[\alpha]_D^{25}=-12.9°$ (1% in chloroform).

*Analysis.*—Calcd. for $C_{20}H_{34}N_2O$: C, 75.42; H, 10.76; N, 8.80. Found: C, 75.19; H, 10.46; N, 8.71.

2-[2-(4-morpholinyl)ethyl]-4,7-etheno-5 - isopropyl - 8-methyl-3a,4,5,6,7,7a-hexahydroisoindoline is obtained in the form of its hydrofluoride, hydrobromide, hydriodide, sulfate (or bisulfate), phosphate (or acid phosphate), acetate, tartrate (or bitartrate), lactate, citrate (or acid citrate), benzenesulfonate, ethanesulfonate, methiodide, allobromide or benzochloride salt, when contacted, respectively, with hydrofluoric acid, hydrobromic acid, hydriodic acid, sulfuric acid, phosphoric acid, acetic acid, tartaric acid, lactic acid, citric acid, benzenesulfonic acid, ethanesulfonic acid, methyl iodide, allyl bromide or benzyl chloride.

2-[2-(4-morpholinyl)ethyl]-4,7-etheno-5 - isopropyl - 8-methyl-3a,4,5,6,7,7a-hexahydroisoindoline in the form of its hydrofluoride salt can be converted to the hydrochloride salt by passing an aqueous solution of the former over an ion-exchange resin saturated with chloride ion.

2-[2-(4-morpholinyl)ethyl]-4,7-etheno-5 - isopropyl - 8-methyl-3a,4,5,6,7,7a-hexahydroisoindoline in acid-addition salt form was found to have a minimum effective hypotensive dose of about 0.01 mg./kg. of body weight when injected subcutaneously into renal hypertensive rats and measured by the photoelectric foot method of Kersten et al., loc. cit. The intravenous toxicity ($ALD_{50}$) in the mouse was found to be 21 mg./kg.

2-[2-(4-morpholinyl)ethyl]-4,7-etheno-5 - isopropyl - 8-methyl-3a,4,5,6,7,7a-hexahydroisoindoline in acid-addition salt form was found to have a coronary dilator activity about 70% that of papaverine when measured on the isolated rabbit heart by the method of Luduena et al., loc. cit.

Example 25

2-(3-hexamethyleniminopropyl)-4,7-etheno - 5 - isopropyl-8-methyl-3a,4,5,6,7,7a-hexahydroisoindoline [I; X is $H_2$, Y is $CH_2CH_2CH_2$, N=B is $N(CH_2)_6$] was prepared from 2-(3-hexamethyleniminopropyl)-1,3-dioxo-4,7 - etheno-5-isopropyl-8-methyl - 3a,4,5,6,7,7a - hexahydroisoindoline (Example 2) (prepared from 12.27 g. of the hydrochloride salt by treatment with an excess of aqueous potassium hydroxide and extraction with ether), 5.69 g. of lithium aluminum hydride and 250 ml. of tetrahydrofuran according to the manipulative procedure described above in Example 24. The resulting product was converted to its phosphate salt with an excess of phosphoric acid in ethanol solution. The product was recrystallized from an ethanol-methanol-ether mixture, and dried at 100° C. in vacuo over phosphorus pentoxide for forty-eight hours and 120–125° C. for twenty hours to give 2-(3-hexamethyleniminopropyl)-4,7-etheno - 5 - isopropyl - 8-methyl-3a,4,5,6,7,7a-hexahydroisoindoline in the form of its diphosphate salt, colorless crystals, M.P. 209.2–212.2° C. (corr.), $[\alpha]_D^{25}=+3.8°$ (1% in 95% ethanol).

*Analysis.*—Calcd. for $C_{23}H_{40}N_2 \cdot 2H_3PO_4$: C, 51.10; H, 8.58; N, 5.18. Found: C, 50.95; H, 8.32; N, 5.10.

2-(3-hexamethyleniminopropyl)-4,7-etheno - 5 - isopropyl-8 - methyl - 3a,4,5,6,7,7a - hexahydroisoindoline in the form of its diphosphate salt was found to have a coronary dilator activity about equal to that of papaverine when measured on the isolated rabbit heart by the method of Luduena et al., loc. cit.

Example 26

2-(2-diethylaminoethyl)-4,7-etheno-5-isopropyl-8-methyl-3a,4,5,6,7,7a-hexahydroisoindoline [I; X is $H_2$, Y is $CH_2CH_2$, N=B is $N(C_2H_5)_2$] was prepared from 2-(2-diethylaminoethyl)-1,3-dioxo-4,7 - etheno - 5 - isopropyl - 8-methyl - 3a,4,5,6,7,7a - hexahydroisoindoline (Example 3) (from 11.07 g. of the hydrochloride salt), 5.69 g. of lithium aluminum hydride and 250 ml. of tetrahydrofuran according to the manipulative procedure described above in Example 24. The resulting free base was converted to its phosphate salt, recrystallized from a methanol-isopropyl alcohol mixture, and dried at 100° C. over phosphorus pentoxide for sixteen hours and at 130° C. for six hours to give 2-(2-diethylaminoethyl)-4,7-etheno-5-isopropyl-8-methyl-3a,4,5,6,7,7a-hexahydroisoindoline in the form of its diphosphate salt, pale tan solid, M.P. 220.8–226.6° C. (corr.), $[\alpha]_D^{25} = +2.6°$ (1% in absolute methanol).

*Analysis.*—Calcd. for $C_{20}H_{36}N_2 \cdot 2H_3PO_4$: C, 47.99; H, 8.46; N, 5.60. Found: C, 47.90; H, 8.53; N, 5.38.

2-(2-diethylaminoethyl)-4,7-etheno-5-isopropyl-8-methyl-3a,4,5,6,7,7a-hexahydroisoindoline in the form of its diphosphate salt was found to have a coronary dilator activity about 1.6 times that of papaverine when measured on the isolated rabbit heart by the method of Luduena et. al., loc. cit. The intravenous toxicity ($ALD_{50}$) in the mouse was found to be 14 mg./kg.

Example 27

2-[3-(1-pyrrolidyl)propyl]-4,7-etheno - 5 - isopropyl-8-methyl-3a,4,5,6,7,7a-hexahydroisoindoline [I; X is $H_2$, Y is $CH_2CH_2CH_2$, N=B is $N(CH_2)_4$] was prepared from 2-[3-(1-pyrrolidyl)propyl]-1,3-dioxo-4,7-etheno - 5 - isopropyl - 8 - methyl - 3a,4,5,6,7,7a - hexahydroisoindoline (Example 4) (from 11.43 g. of the hydrochloride salt), 5.69 g. of lithium aluminum hydride and 300 ml. of tetrahydrofuran according to the manipulative procedure described above in Example 24. The product was obtained in the form of its diphosphate salt, M.P. 150–165° C. (uncorr.).

Example 28

2-[2-(1-piperidyl)ethyl]-4,7-etheno-5-isopropyl-8-methyl-3a,4,5,6,7,7a-hexahydroisoindoline [I; X is $H_2$, Y is $CH_2CH_2$, N=B is $N(CH_2)_5$] was prepared from 2-[2-(1-piperidyl)ethyl]-1,3-dioxo-4,7-etheno-5-isopropyl-8-methyl-3a,4,5,6,7,7a-hexahydroisoindoline (Example 5) (from 11.43 g. of the hydrochloride salt), 5.69 g. of lithium aluminum hydride and 300 ml. of tetrahydrofuran according to the manipulative procedure described above in Example 24. The product was converted to its phosphate salt, recrystallized from methanol, and dried at 105° C. in vacuo over phosphorus pentoxide for sixteen hours and at 130° C. for eight hours to give 2-[2-(1-piperidyl)-ethyl]-4,7-etheno-5-isopropyl-8-methyl-3a,4,5,6,7,7a-hexahydroisoindoline in the form of its diphosphate salt, light tan platelets, M.P. 214.2–216.0° C. (corr.), $[\alpha]_D^{25} = +24.0°$ (0.5% in methanol).

*Analysis.*—Calcd. $C_{21}H_{36}N_2 \cdot 2H_3PO_4$: C, 49.21; H, 8.26; N, 5.47. Found: C, 48.93; H, 8.51; N, 5.36.

2-[2-(1-piperidyl)ethyl]-4,7-etheno-5-isopropyl-8-methyl-3a,4,5,6,7,7a-hexahydroisoindoline in the form of its diphosphate salt was found to have a coronary dilator activity about 120% that of papaverine when measured on the isolated rabbit heart by the method of Luduena et al., loc. cit.

Example 29

2-[2-(1-piperazinyl)ethyl]-4,7-etheno - 5 - isopropyl-8-methyl-3a,4,5,6,7,7a-hexahydroisoindoline [I; X is $H_2$, Y is $CH_2CH_2$, N=B is $N(CH_2CH_2)_2NH$] was prepared from 2-[2-(1-piperazinyl)ethyl]-1,3-dioxo-4,7-etheno-5-isopropyl-8-methyl - 3a,4,5,6,7,7a - hexahydroisoindoline (Example 6) (from 12.55 g. of the dihydro chloride salt), 4.55 g. of lithium aluminum hydride and 300 ml. of tetrahydrofuran according to the manipulative procedure described above in Example 24. The product was converted to its phosphate salt, M.P. 186–196° C. (uncorr.).

Example 30

2-(2-dimethylaminoethyl)-4,7-etheno - 5 - isopropyl-8-methyl-3a,4,5,6,7,7a-hexahydroisoindoline [I; X is $H_2$, Y is $CH_2CH_2$, N=B is $N(CH_3)_2$] was prepared from 2-(2-dimethylaminoethyl)-1,3-dioxo-4,7-etheno - 5 - isopropyl-8-methyl-3a,4,5,6,7,7a-hexahydroisoindoline (Example 7) (from 13.54 g. of the phosphate salt), 5.31 g. of lithium aluminum hydride and 300 ml. of tetrahydrofuran according to the manipulative procedure described above in Example 24. The product was converted to the phosphate salt, recrystallized from a methanol-isopropyl alcohol mixture, and dried at 105–110° C. in vacuo for twenty-four hours to give 10.68 g. of 2-(2-dimethylaminoethyl)-4,7-etheno-5-isopropyl-8-methyl - 3a,4,5,6,7,7a - hexahydroisoindoline in the form of its diphosphate salt, nearly colorless platelets, M.P. 233.2–234.4° C. (corr.), $[\alpha]_D^{25} = +1.6°$ (0.5% in methanol).

*Analysis.*—Calcd. for $C_{18}H_{32}N_2 \cdot 2H_3PO_4$: C, 45.76; H, 8.11; N, 5.93; P, 13.11. Found: C, 45.98; H, 8.04; N, 6.01; P, 12.95.

Example 31

2-(2-N-methylethylaminoethyl)-4,7-etheno - 5 - isopropyl-8-methyl-3a,4,5,6,7,7a-hexahydroisoindoline [I; X is $H_2$, Y is $CH_2CH_2$, N=B is $N(CH_3)(C_2H_5)$] can be prepared by lithium aluminum hydride reduction of 2-(2-N-methylethylaminoethyl)-1,3-dioxo-4,7-etheno - 5 - isopropyl-8-methyl - 3a,4,5,6,7,7a - hexahydroisoindoline (Example 8) according to the manipulative procedure described above in Example 24.

Example 32

2-(2-di-n-butylaminoethyl)-4,7-etheno - 5 - isopropyl-8-methyl-3a,4,5,6,7,7a-hexahydroisoindoline [I; X is $H_2$, Y is $CH_2CH_2$, N=B is $N(C_4H_9)_2$] can be prepared by lithium aluminum hydride reduction of 2-(2-di-n-butylaminoethyl)-1,3-dioxo-4,7-etheno - 5 - isopropyl-8-methyl-3a,4,5,6,7,7a-hexahydroisoindoline (Example 9) according to the manipulative procedure described above in Example 24.

Example 33

2-(2-di-n-hexylaminoethyl)-4,7-etheno - 5 - isopropyl-8-methyl-3a,4,5,6,7,7a-hexahydroisoindoline [I; X is $H_2$, Y is $CH_2CH_2$, N=B is $N(C_6H_{13})_2$] can be prepared by lithium aluminum hydride reduction of 2-(2-di-n-hexylaminoethyl)-1,3-dioxo-4,7-etheno - 5 - isopropyl-8-methyl-3a,4,5,6,7,7a-hexahydroisoindoline (Example 10) according to the manipulative procedure described above in Example 24.

Example 34

2-(2-dicyclohexylaminoethyl)-4,7-etheno - 5 - isopropyl-8-methyl-3a,4,5,6,7,7a-hexahydroisoindoline [I; X is $H_2$, Y is $CH_2CH_2$, N=B is $N(C_6H_{11})_2$] can be prepared by lithium aluminum hydride reduction of 2-(2-dicyclohexylaminoethyl)-1,3-dioxo-4,7-etheno - 5 - isopropyl-8-methyl-3a,4,5,6,7,7a-hexahydroisoindoline (Example 11) according to the manipulative procedure described above in Example 24.

Example 35

2-[2-bis(4-methylcyclohexyl)aminoethyl] - 4,7 - etheno-5-isopropyl - 8 - methyl-3a,4,5,6,7,7a-hexahydroisoindoline [I; X is $H_2$, Y is $CH_2CH_2$, N=B is $N(C_6H_{10}CH_3-4)_2$] can be prepared by lithium aluminum hydride reduction of 2-[2-bis(4-methylcyclohexyl)aminoethyl]-1,3-dioxo-4,7-etheno-5-isopropyl - 8 - methyl-3a,4,5,6,7,7a-hexahydroisoindoline (Example 12) according to the manipulative procedure described above in Example 24.

Example 36

2-(2-N-methylcyclohexylaminoethyl) - 4,7 - etheno-5-isopropyl-8-methyl - 3a,4,5,6,7,7a - hexahydroisoindoline [I; X is $H_2$, Y is $CH_2CH_2$, N=B is $N(CH_3)(C_6H_{11})$] can be prepared by lithium aluminum hydride reduction of 2-(2-N-methylcyclohexylaminoethyl) - 1,3 - dioxo-4,7-

Example 37

2-[2-(2-methyl-1-pyrrolidyl)ethyl] - 4,7 - etheno-5-isopropyl-8-methyl-3a,4,5,6,7,7a-hexahydroisoindoline [I; X is $H_2$, Y is $CH_2CH_2$, N=B is 2-methyl-1-pyrrolidyl] can be prepared by lithium aluminum hydride reduction of 2-[2-(2-methyl-1-pyrrolidyl)ethyl] - 1,3 - dioxo-4,7-etheno-5-isopropyl-8-methyl - 3a,4,5,6,7,7a - hexahydroisoindoline (Example 14) according to the manipulative procedure described above in Example 24.

Example 38

2-[2-(4-methyl-1-piperazinyl)ethyl] - 4,7 - etheno-5-isopropyl-8-methyl-3a,4,5,6,7,7a-hexahydroisoindoline [I; X is $H_2$, Y is $CH_2CH_2$, N=B is $N(CH_2)_4NCH_3$] can be prepared by lithium aluminum hydride reduction of 2-[2-(4-methyl-1-piperazinyl)ethyl] - 1,3 - dioxo-4,7-etheno-5-isopropyl-8-methyl - 3a,4,5,6,7,7a - hexahydroisoindoline (Example 15) according to the manipulative procedure described above in Example 24.

Example 39

2-(2-dibenzylaminoethyl)-4,7-etheno - 5 - isopropyl-8-methyl-3a,4,5,6,7,7a-hexahydroisoindoline [I; X is $H_2$, Y is $CH_2CH_2$, N=B is $N(CH_2C_6H_5)_2$] can be prepared by lithium aluminum hydride reduction of 2-(2-dibenzylaminoethyl)-1,3-dioxo-4,7-etheno - 5 - isopropyl-8-methyl-3a,4,5,6,7,7a-hexahydroisoindoline (Example 16) according to the manipulative procedure described above in Example 24.

Example 40

2-[2-bis(2-phenylethyl)aminoethyl] - 4,7 - etheno-5-isopropyl-8-methyl-3a,4,5,6,7,7a-hexahydroisoindoline [I; X is $H_2$, Y is $CH_2CH_2$, N=B is $N(CH_2CH_2C_6H_5)_2$] can be prepared by lithium aluminum hydride reduction of 2-[2-bis(2-phenylethyl)aminoethyl] - 1,3 - dioxo-4,7-etheno-5-isopropyl-8-methyl - 3a,4,5,6,7,7a-hexahydroisoindoline (Example 17) according to the manipulative procedure described above in Example 24.

Example 41

2-(2-N-methylbenzylaminoethyl)-4,7-etheno - 5 - isopropyl-8-methyl-3a,4,5,6,7,7a-hexahydroisoindoline [I; X is $H_2$, Y is $CH_2CH_2$, N=B is $N(CH_3)(CH_2C_6H_5)$] can be prepared by lithium aluminum hydride reduction of 2-(2-N-methylbenzylaminoethyl)-1,3-dioxo - 4,7 - etheno-5-isopropyl - 8 - methyl - 3a,4,5,6,7,7a - hexahydroisoindoline (Example 18) according to the manipulative procedure described above in Example 24.

Example 42

2 - (2 - dimethylamino - 1 - methylethyl) - 4,7 - etheno-5 - isopropyl - 8 - methyl - 3a,4,5,6,7,7a - hexahydroisoindoline [I; X is $H_2$, Y is $CH(CH_3)CH_2$, N=B is $N(CH_3)_2$] can be prepared by lithium aluminum hydride reduction of 2-(2-dimethylamino - 1 - methylethyl) - 1,3 - dioxo - 4,7-etheno - 5 - isopropyl - 8 - methyl - 3a,4,5,6,7,7a - hexahydroisoindoline (Example 19) according to the manipulative procedure described above in Example 24.

Example 43

2 - (2 - dimethylaminopropyl) - 4,7 - etheno - 5 - isopropyl - 8 - methyl - 3a,4,5,6,7,7a - hexahydroisoindoline [I; X is $H_2$, Y is $CH_2CH(CH_3)$, N=B is $N(CH_3)_2$] can be prepared by lithium aluminum hydride reduction of 2 - (2 - dimethylaminopropyl) - 1,3 - dioxo - 4,7 - etheno-5 - isopropyl - 8 - methyl - 3a,4,5,6,7,7a, - hexahydroisoindoline (Example 20) according to the manipulative procedure described above in Example 24.

Example 44

2 - (4 - dimethylaminobutyl) - 4,7 - etheno - 5 - isopropyl - 8 - methyl - 3a,4,5,6,7,7a - hexahydroisoindoline [I; X is $H_2$, Y is $CH_2CH_2CH_2CH_2$, N=B is $N(CH_3)_2$] can be prepared by lithium aluminum hydride reduction of 2-(4-dimethylaminobutyl) - 1,3 - dioxo - 4,7 - etheno - 5 - isopropyl - 8 - methyl - 3a,4,5,6,7,7a-hexahydroisoindoline (Example 21) according to the manipulative procedure described above in Example 24.

Example 45

2 - (5 - dimethylaminopentyl) - 4,7 - etheno - 5 - isopropyl - 8 - methyl - 3a,4,5,6,7,7a - hexahydroisoindoline [I; P is $H_2$, Y is $CH_2CH_2CH_2CH_2CH_2$, N=B is $N(CH_3)_2$] can be prepared by lithium aluminum hydride reduction of 2 - (5 - dimethylaminopentyl) - 1,3 - dioxo - 4,7 - etheno-5 - isopropyl - 8 - methyl - 3a,4,5,6,7,7a - hexahydroisoindoline (Example 22) according to the manipulative procedure described above in Example 24.

Example 46

2 - (2 - dimethylamino - 1,2 - dimethylethyl) - 4,7 - etheno - 5 - isopropyl - 8 - methyl - 3a,4,5,6,7,7a - hexahydroisoindoline [I; X is $H_2$, Y is $CH(CH_3)CH(CH_3)$, N=B is $N(CH_3)_2$] can be prepared by lithium aluminum hydride reduction of 2-(2-dimethylamino-1,2-dimethylethyl)-1,3 - dioxo - 4,7 - etheno - 5 - isopropyl - 8 - methyl - 3a, 4,5,6,7,7a - hexahydroisoindoline (Example 23) according to the manipulative procedure described above in Example 24.

Example 47

*1,3 - dioxo - 4,7 - etheno - 5 - isopropyl - 8 - methyl - 3a, 4,5,6,7,7a-hexahydroisoindoline.*—A mixture of 5.0 g. of the maleic anhydride adduct of α-phellandrene and 200 ml. of formamide was heated in vacuo (25 mm.) at 120° C. for one hour. The vacuum was removed, and the mixture was gradually heated to a maximum of 180° C. and then cooled to 160° C. over a period of three hours. The mixture was cooled to 125–130° C., the vacuum again applied and 60–75 ml. of formamide was removed by distillation during one and one-half hours. The reaction mixture was cooled to 20° C. and added to ice water. The solid product was collected by filtration, recrystallized from aqueous acetone and dried at 70° C. in vacuo for twenty-four hours and at 100–103° C. in vacuo over phosphorus pentoxide for seventy-two hours to give 4.4 g. of 1,3-dioxo-4,7-etheno - 5 - isopropyl - 8 - methyl - 3a,4,5,6,7,7a-hexahydroisoindoline (maleimide adduct of α-phellandrene), colorless plates, M.P. 135.8–137.6° C. (corr.).

*Analysis.*—Calcd. for $C_{14}H_{19}NO_2$: C, 72.07; H, 8.21; N, 6.01. Found: C, 72.36; H, 7.93; N, 5.88.

1,3 - dioxo - 4,7 - etheno - 5 - isopropyl - 8 - methyl-3a,4,5,6,7,7a - hexahydroisoindoline in the form of its sodium salt in aqueous solution can be caused to react with a molar equivalent amount of 2-diethylaminoethyl bromide to give 2 - (2 - diethylaminoethyl) - 1,3 - dioxo-4,7 - etheno - 5 - isopropyl - 8 - methyl - 3a,4,5,6,7,7a-hexahydroisoindoline, identical with the compound obtained in Example 3.

1,3 - dioxo - 4,7 - etheno - 5 - isopropyl - 8 - methyl-3a,4,5,6,7,7a-hexahydroisoindoline can be caused to react with lithium aluminum hydride according to the manipulative procedure described above in Example 24 to give 4,7 - etheno - 5 - isopropyl - 8 - methyl - 3a,4,5,6,7,7a-hexahydroisoindoline, and the latter can be caused to react with 2-diethylaminoethyl bromide in the presence of sodium carbonate to give 2-(2-diethylaminoethyl)-4,7-etheno-5- isopropyl - 8 - methyl - 3a,4,5,6,7,7a - hexahydroisoindoline, identical with the compound obtained in Example 26.

This application is a division of our co-pending United States Patent application Serial No. 55,125, filed September 12, 1960, now U.S. Patent 3,140,285, issued July 7, 1964.

We claim:
1. A compound of the formula

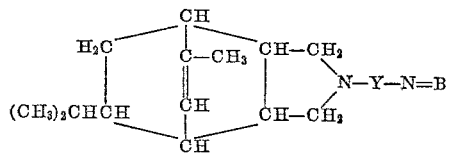

wherein Y represents lower-alkylene, and N=B represents a member of the group consisting of di-lower-alkylamino; dicycloalkylamino in which the cycloalkyl has from 5 to 6 ring members; N-(cycloalkyl)-lower-alkylamino in which the cycloalkyl has from 5 to 6 ring members; 1-pyrrolidyl; 1-piperidyl; hexamethyleneimino; C-lower alkylated 1-pyrrolidyl, 1-piperidyl and hexamethyleneimino; 4-morpholinyl; 1-piperazinyl; di(phenyl-lower-alkyl)amino; and N-(phenyl-lower-alkyl)-N-lower-alkylamino.

2. A compound of the formula

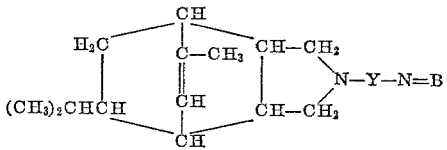

wherein Y represents lower-alkylene, and N=B represents di-lower-alkylamino.

3. A compound of the formula

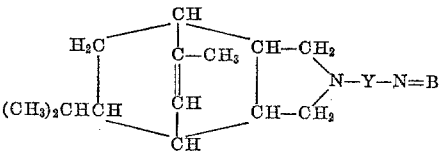

wherein Y represents lower-alkylene, and N=B represents polymethylenimino having from 5 to 7 ring members.

4. 2 - [2 - (4 - morpholinyl)ethyl] - 4,7 - etheno - 5 - isopropyl - 8 - methyl - 3a,4,5,6,7,7a - hexahydroisoindoline.

5. 2 - (3 - hexamethyleniminopropyl) - 4,7 - etheno - 5 - isopropyl - 8 - methyl - 3a,4,5,6,7,7a - hexahydroisoindoline.

6. 2 - (2 - diethylmainoethyl) - 4,7 - etheno - 5 - isopropyl - 8 - methyl - 3a,4,5,6,7,7a - hexahydroisoindoline.

7. 2 - [2 - (1 - piperidyl)ethyl] - 4,7 - etheno - 5 - isopropyl - 8 - methyl - 3a,4,5,6,7,7a - hexahydroisoindoline.

8. 2 - (2 - dimethylaminoethyl) - 4,7 - etheno - 5 - isopropyl - 8 - methyl - 3a,4,5,6,7,7a - hexahydroisoindoline.

References Cited by the Examiner

Gaylord: "Reduction With Complex Metal Hydrides," Interscience Publishers, Inc. (1956).

IRVING MARCUS, *Primary Examiner.*
NICHOLAS RIZZO, *Examiner.*